United States Patent [19]
Matsui et al.

[11] Patent Number: 6,030,702
[45] Date of Patent: *Feb. 29, 2000

[54] SHEET FOR PROTECTING PAINT FILMS OF AUTOMOBILES

[75] Inventors: Komaharu Matsui, Kanagawa; Takeshi Eda; Hiroshi Ueda, both of Hyogo; Mitsuyoshi Shirai, Osaka; Kenji Sano, Osaka; Mitsuru Horada, Osaka; Naoyuki Nishiyama, Osaka, all of Japan

[73] Assignees: Nitto Denki Corporation, Osaka; Kansai Paint Co., Ltd., Hyogo, both of Japan

[*] Notice: This patent issued on a continued prosecution application filed under 37 CFR 1.53(d), and is subject to the twenty year patent term provisions of 35 U.S.C. 154(a)(2).

[21] Appl. No.: 08/728,900

[22] Filed: Oct. 10, 1996

[30] Foreign Application Priority Data

Oct. 11, 1995 [JP] Japan ................................. 7-290429

[51] Int. Cl.⁷ ..................................................... C09J 7/02
[52] U.S. Cl. ..................................... 428/343; 428/355 BL
[58] Field of Search .................................... 428/343, 354, 428/355 BL

[56] References Cited

U.S. PATENT DOCUMENTS

| | | |
|---|---|---|
| 5,127,974 | 7/1992 | Tomiyama et al. . |
| 5,601,917 | 2/1997 | Matsui et al. . |
| 5,612,135 | 3/1997 | Matsui et al. . |
| 5,643,676 | 7/1997 | Dobashi ................................. 428/343 |
| 5,667,858 | 9/1997 | Pokorny ................................. 428/354 |
| 5,747,132 | 5/1998 | Matsui et al. . |
| 5,810,960 | 9/1998 | Matsui et al. . |

FOREIGN PATENT DOCUMENTS

519278A2  12/1992  European Pat. Off. .

*Primary Examiner*—Jenna Davis
*Attorney, Agent, or Firm*—Sughrue, Mion, Zinn, Macpeak & Seas, PLLC

[57] ABSTRACT

A sheet for protecting paint films of automobiles for adhering to the incompletely cured paint films of automobiles comprising two pack urethane paint, the sheet comprising a support and a pressure-sensitive adhesive layer formed thereon, wherein the sheet has a Young's modulus E of at least 75 N/mm² and a coefficient of flexural stress k represented by the formula $k=Eh^3$ wherein h is a thickness of the support, of 0.035 or less. The protective sheet can uniformly protect the paint films and easily be peeled and removed therefrom without causing environmental problems and adhesive remaining of the pressure-sensitive adhesive layer. Even when the sheet is adhered to incompletely cured paint films of automobiles and they are allowed to stand for a long period of time under an outside high temperature in summer, the sheet does not cause the deformation of the paint film and the microdeformations by the deformation of the paint film at the edge portion of the pressure-sensitive adhesive layer. The protective sheet can be reserved in a roll state without causing the change of form by, for example, a telescope phenomenon.

6 Claims, No Drawings

SHEET FOR PROTECTING PAINT FILMS OF AUTOMOBILES

FIELD OF THE INVENTION

The present invention relates to a sheet for protecting paint films of automobiles, which is excellent in adhesive workability to curved surfaces, weather resistance, and peelability after adhering to the paint films for a long period of time, is difficult to deform paint films, can be applied to paint films in an incompletely cured state, and is suitable for the surface protection of bodies, parts, etc., of automobiles.

BACKGROUND OF THE INVENTION

Protective sheets which can be applied to paint films of automobiles, which are in an incompletely cured state have been requested. A protective sheet generally comprises a polymeric sheet having formed thereon a pressure-sensitive adhesive layer and aims at the prevention of paint films of automobiles and the parts thereof from being damaged, frosted, discolored, etc., by various floating matters and colliding matters, such as dirts, dusts, acid rain, pebbles, etc., when loading automobiles, the parts thereof, etc., just finished painting on trucks, ships, trains, etc., and transporting them remote places such as overseas, etc. Such a protective sheet has the advantages to overcome difficult points in a conventional system of covering a paint film having a thickness of from 5 to 20 μm comprising a wax paint, that uniform protection with a uniform paint film is difficult, the paint film may easily be stained, the paint film is weak in the protection function to colliding matters such as acid rain, pebbles, etc., a large labor is required for forming and removing the paint films, and also use of a solvent may cause environmental problems such as the waste liquid treatment, etc.

In the above system, when a two-pack urethane paint is used, paint films for automobiles in a completely cured state can be formed by a heat-curing treatment and an aging treatment after painting. However, the aging treatment can be practiced during the transporting time to overseas, etc. Therefore, a method of shortening the aging treatment time after the heat-curing treatment, adhering a protective sheet to the paint film of the automobile in an incompletely cured state, transporting the automobile, and utilizing the transporting time for a part of the aging time for completely curing the paint film, whereby the efficiency of the supply of the parts or the automobiles is improved has come into wide use.

However, in the conventional sheets for protecting paint films of automobiles, there is a problem that when the protective sheet is applied to a soft paint film or a incompletely cured paint film and is allowed to stand for a long period of time under an outdoor high temperature in summer, etc., the paint film is deformed at the edge portions of the pressure-sensitive adhesive layer, for example, edges of entrapped air or sheet edges, and the deformed traces are clearly observed.

When the thickness of the pressure-sensitive adhesive layer in the sheet for protecting paint films of automobiles is increased to protect the deformation of the paint film, a problem occurs that when the sheet is preserved in a roll state, the form of the roll is deformed by a telescope phenomenon, and in peeling the sheet from the paint film, adhesive remaining may occur at the edge portions of the pressure-sensitive adhesive layer.

SUMMARY OF THE INVENTION

An object of the present invention is to develop a sheet for protecting a paint film of automobiles, which is difficult to form microdeformations due to the deformation of a paint film even when the sheet is adhered to a paint film of automobiles, the paint film comprising a two-pack urethane paint and being in an incompletely cured state, and is allowed to stand under an outdoor high temperature, etc., for a long period of time, and can be easily peeled from the paint film without adhesive remaining of the pressure-sensitive adhesive layer, while maintaining the advantages of the protective sheet described above.

According to the present invention, there is provided a sheet for protecting a paint film of automobiles, for adhering to incompletely cured paint films of automobiles, the paint film comprising a two-pack urethane paint, which comprises a support having formed thereon a pressure-sensitive adhesive layer, wherein the sheet has a Young's modulus E of at least 75 N/mm$^2$, and has a coefficient of flexural stress k represented by the formula k=Eh$^3$ wherein h is a thickness (mm) of the support, of 0.035 or less.

DETAILED DESCRIPTION OF THE INVENTION

The present invention is described in detail below.

As described above, by forming the sheet having a low coefficient of flexural stress while satisfying the above-described Young's modulus, a sheet for protecting the paint films of automobiles can be obtained, which adheres with a good workability to incompletely cured soft paint films of automobiles comprising a two-pack urethane paint, is difficult to cause deformation of the paint film in the edge portions of the pressure-sensitive adhesive layer, such as edges of entrapped air or the sheet edges even when allowing to stand under an outdoor high temperature in summer for a long period of time, is also difficult to give microdeformations to the paint film, can be easily peeled from the paint film without forming adhesive remaining of the pressure-sensitive adhesive layer, is excellent in the protection function to floating matters or colliding matters, such as acid rain, dusts, pebbles, etc., and keeps the advantage of the protective sheet system capable of simply and uniformly protecting the paint film and of being easily peeled and removed without inducing an environmental problem. Furthermore, the sheet for protecting the paint films of automobiles can be wound in a roll state which is difficult to cause the deformation of the form by, for example, a telescope phenomenon at the preservation of the roll.

In the present invention, the Young's modulus of at least 75 N/mm$^2$ is for improving the adhering workability to and the peeling workability from the paint films of automobiles having many curved surface portions by the suppression of elongation, etc., and the details of the mechanism of obtaining the merits and effects by forming the sheet of the low coefficient of flexural stress while satisfying the Young's modulus have not yet been clarified. However, the inventors consider the mechanism as follows.

That is, it is considered that since the occurrence of microdeformations due to the deformation of the paint film at the edge portions of the pressure-sensitive adhesive layer in applying the protective sheet to the incompletely cured soft coated film and allowing to stand them in the outdoors for a long period of time tends to be easily occurred as the paint film is softer, the microdeformation is caused by the occurrence of nonuniform force by a very small deformation of the protective sheet caused by environmental changes such as a temperature, etc., during preserving for a long period of time, which causes nonuniform stress in the paint film to cause the deformation of the paint film, which becomes the microdeformation.

Accordingly, the above mechanism is a technical theme which cannot be dealt with the conventional planning conception of mainly considering the properties of the domain to which a large external force is applied, such as the improvement of the strength of a support, etc., simply paying attention to the adhering workability and the peeling workability.

The sheet for protecting paint films of automobiles of the present invention comprises a support having formed thereon a pressure-sensitive adhesive layer, wherein the sheet has a Young's modulus E of at least 75 N/mm² and a coefficient of flexural stress represented by the formula k=Eh³ wherein a thickness of the support is h mm, of 0.035 or less. The protective sheet of the present invention is for adhering to an incompletely cured paint film of automobiles, comprising a two pack urethane paint.

The support which can be used in the present invention is a polymer film compounded with an inorganic filler, and preferably a film comprising an olefinic polymer compounded with an inorganic filler.

Examples of the olefinic polymer are polypropylene polymers such as the homopolymer, the block polymer or the random polymer; ethylene polymers such as low-density polyethylene, high-density polyethylene or linear low-density polyethylene; and ethylene-propylene copolymers. In forming the support, one or two or more kinds of the polymers can be used.

Examples of the inorganic filler which can be compounded in the support are titanium oxide, calcium carbonate, magnesium oxide, and zinc oxide. The inorganic fillers may be used alone or as a mixture thereof. The amount of the organic filler compounded can be properly determined. In general, the compounding amount is from 5 to 20% by weight, and preferably from 8 to 15% by weight, based on the weight of the support, from the points of the hiding power of the paint film color and the film-forming property for the film.

If required and necessary, the support may be compounded with appropriate additives such as a ultraviolet stabilizer, an antioxidant, etc. The compounding amounts of the ultraviolet stabilizer and the antioxidant are from 0.1 to 5% by weight, and preferably 0.1 to 3% by weight, based on the weight of the support, from the points of preventing the occurrence of deterioration of the support and the working environmental property by the scattering prevention of additives at the film formation of the film.

There are no particular restrictions on the ultraviolet stabilizer and the antioxidant, and conventional materials can appropriately be used. For example, examples of the ultraviolet stabilizer include benzotriazole ultraviolet stabilizers, hindered amine ultraviolet stabilizers, and benzoate ultraviolet stabilizers.

More specifically, examples of the ultraviolet stabilizer are 2-(3-t-butyl-5-methyl-2-hydroxyphenyl)-5-chlorobenzotriazole, 2-(3,5-di-t-butyl-2-hydroxyphenyl)-5-chlorobenzotriazole, poly[{6-(1,1,3,3-tetramethylbutyl)amino-1,3,5-triazine-2,4-diyl}{2,2,6,6-tetramethyl-4-piperidyl)imino}-hexamethylene {(2,2,6,6,-tetramethyl-4-piperidyl)imino}], dimethylsuccinate-1-(2-hydroxyethyl)-4-hydroxy-2,2,6,6-tetra-methylpiperidine polycondensate, and 2,4-di-t-butylphenyl-3,5-t-butyl-4-hydroxybenzoate.

The support can be obtained by molding the polymer compounded with an inorganic filler and other additives by an appropriate method such as an extrusion molding method by a T die, a casting method of a solution or a molten mixture liquid.

The thickness of the support can be appropriately determined in the range that the Young's modulus of the sheet for protecting paint films of automobiles obtained is at least 75 N/mm² and the coefficient of flexural stress thereof is 0.035 or less. That is, the sheet for protecting paint films of automobiles of the present invention has the Young's modulus of at least 75 N/mm², and the coefficient of flexural stress of 0.035 or less. The coefficient of flexural stress k is defined by the following formula;

$$k = Eh^3$$

wherein E is a Young's modulus (N/mm²), that is, the tensile elastic modulus of the entire sheet for protecting paint films of automobiles in a machine direction, and h is a thickness (mm) of the support.

As described above, it is considered that the occurrence of microdeformations by the deformation of the paint film is caused by the deformation of the protective sheet by the change of environment. Accordingly, for the incompletely cured soft paint film, it is considered to be effective to decrease the force caused by the deformation of the protective sheet. In this case, decreasing the coefficient of flexural stress k represented by the above formula to 0.035 or less aims at reducing the force caused by the flexural deformation of the protective sheet.

That is, since the painted surface of an automobile has many curved surface portions, stress caused by the flexural elasticity occurs in the protective sheet adhered to the painted surface. Further, at the circumference of entrapped air in adhering the protective sheet to the painted surface of an automobile, the protective sheet is extremely curved to cause a local stress, and also the inside pressure in the bubbles is changed by the change of temperature to increase or decrease the flexural load. The coefficient of flexural stress described above is the condition for preventing the deformation of the paint film by decreasing the force caused in the protective sheet by such a flexural deformation.

From the above formula, it is effective for the reduction of the coefficient of flexural stress k to decrease the Young's modulus. Also the deformation of the protective sheet by the environmental changes is greatly influenced by the temperature change. Even when the deformation of the protective sheet by the temperature change is generally small, the occurrence of the force in the range of the very small deformation is greatly influenced by the Young's modulus. Therefore, it can be said that the reduction of the Young's modulus is more effective, but the Young's modulus relates to an elongation and also relates to the adhering workability, the peeling workability, etc., of the protective sheet. In the present invention, from the points that curve surface portions are large and the protective sheet is for adhering to the soft paint film surfaces of automobiles, the Young's modulus is at least 75 N/mm², and preferably from 100 to 2,000 N/mm², and more preferably from 300 to 1,800 N/mm².

It is effective for decreasing the coefficient of flexural stress k to decrease the thickness of the support, and in the protective support, the Young's modulus of the support is important. Therefore, it can be said that the thinner support is more advantageous from the point of decreasing the deformation stress based on the Young's modulus. However, the thickness of the support relates to the strength and the protecting function of the protective sheet and the handling properties such as the adhering workability, the peeling workability, etc. From such points of the present invention, the thickness of the support is generally from 10 to 100 μm, preferably from 15 to 80 μm, and more preferably from 20 to 70 μm.

Considering the Young's modulus and the thickness of the support described above, the coefficient of flexural stress in the sheet for protecting the paint films of automobiles is preferably from 0.001 to 0.035, and more preferably from 0.005 to 0.033 from the point of preventing the occurrence of the microdeformations by the deformation of the paint film.

If required and necessary, a surface treating layer of a releasing agent may be formed on the surface of not forming the pressure-sensitive adhesive layer of the support. The treatment with the releasing agent has an advantage to facilitate rewinding the protective sheet wound in a roll form.

As the releasing agent, any appropriate releasing agent may be used without any restriction. For example, there are silicone releasing agents comprising a polyorganosiloxane such as polydimethylsiloxane. A heat-curing type releasing agent such as an addition reaction type releasing agent, a condensation reaction type releasing agent, etc., and a silicone releasing agent such as a radiation curing type releasing agent as such as an ultraviolet curing type releasing agent, an electron ray curing type releasing agent, etc., can also be preferably used.

Further, a polymer of a higher alcohol ester of (meth)-acrylic acid, a copolymer of the same and other monomer, and a long-chain alkyl releasing agent comprising a reaction product of a hydroxy group-containing polymer such as polyvinyl alcohol or a cellulose and an isocyanate compound having a long-chain alkyl group, etc., can be used. In this case, the long chain alkyl releasing agent having a long-chain alkyl group of from 12 to 24 carbon atoms can be preferably used.

If required and necessary, an appropriate surface treatment such as a treatment with an undercoat agent (primer) or an electrochemical treatment such as a corona treatment, a plasma treatment, a sputtering treatment, etc., for improving the adhesion with a pressure-sensitive adhesive layer may be applied to the surface of the support on which a pressure-sensitive adhesive layer is formed.

The pressure-sensitive adhesive layer can be formed using a polyisobutylene, an isobutylene-isoprene copolymer (butyl rubber), or a mixture thereof. A polyisobutylene or an isobutylene-isoprene copolymer, having a weight average molecular weight of from 300,000 to 800,000, and preferably from 300,000 to 600,000 is preferably used from the points of preventing the occurrence of adhesive remaining by the insufficient cohesive force, preventing the deformation of a roll form in winding the protective sheet in a roll form, relaxing the stress formed by the deformation of the support, preventing the occurrence of microdeformations caused by the deformation of the paint film, and strengthening the adhesive force.

The protective sheet can be formed by a proper method such as a method of coating a solution of a pressure-sensitive adhesive component in a solvent or a molten liquid of a pressure-sensitive adhesive component on a support, a method of transferring and adhering a pressure-sensitive adhesive layer formed on a separator by the above method onto a support.

The thickness of the pressure-sensitive adhesive layer is from 10 to 20 $\mu$m, and preferably from 14 to 20 $\mu$m, from the points of showing the desired adhesive force, preventing the occurrence of microdeformations caused by the deformation of the paint film, preventing the formation of adhesive remaining at the edge portion of the protective sheet, and preventing the occurrence of the deformation of the roll form of the protective sheet in winding the protective sheet in the roll form.

If required and necessary, the pressure-sensitive adhesive layer may be protected by temporarily adhering thereto a separator before practically using the protective sheet.

In forming the pressure-sensitive adhesive layer, if necessary, the pressure-sensitive adhesive may be compounded with an ultraviolet stabilizer to improve the weather resistance. The ultraviolet stabilizer which can be used is the same materials as those for the support. The compounding amount of the ultraviolet stabilizer in the pressure-sensitive adhesive layer is from 0.1 to 5% by weight, and preferably from 0.1 to 3% by weight, based on the weight of the pressure-sensitive adhesive.

The sheet for protecting paint films of automobiles of the present invention is used for adhering to incompletely cured paint films of automobiles comprising two pack urethane paint such as an acryl-urethane paint.

The incompletely cured state of the paint film is an incompletely aging-treated state omitting a part of the aging treatment time after heat-curing treatment, such as the paint film for the external plates of an automobile body having a Knoop hardness of from 5 to 13, the paint film for automobile bumpers having a Knoop hardness of from 2 to 8, or the paint film for automobile parts, in an incompletely cured state of from 40 to 80% of the completely cured state determined based on, for example, a hardness of the paint film.

Accordingly, the sheet for protecting paint films of automobiles is used for the method of utilizing the transporting time to overseas, etc., for the aging treatment, and is applied by adhering to the paint films of automobiles, the aging treatment time of which is incomplete. In addition, the aged state in the paint films of automobiles, to which the protective sheet is adhered, is appropriately determined according to the hardness-generating characteristics by the kind of the paint film and, in general, is the incompletely cured state of from 40 to 80% of the completely cured state of the paint film determined based on the hardness of the paint film by the Knoop hardness, etc., as described above.

The present invention is described in more detail by reference to the following examples, but the invention is not limited to those examples. Unless otherwise indicated, all parts are by weight.

EXAMPLE 1

A pressure-sensitive adhesive solution composed of 100 parts of a polyisobutylene having a polystyrene-converted weight average molecular weight (hereinafter the same) of 650,000 by gel permeation chromatography, 20 parts of a polyisobutylene having the weight average molecular weight of 90,000, and 750 parts of toluene was coated on a 30 $\mu$m thick polypropylene film containing titanium oxide and dried at 80° C. for 3 minutes to obtain a protective sheet having a 15 $\mu$m thick pressure-sensitive adhesive layer.

The polypropylene film used was formed by an extrusion molding method by a T die of a compounded mixture of 92.7 parts of block polypropylene having a melt flow rate (MFR) of 4 g/10 min, 7 parts of titanium oxide, and 0.3 part of 2-(3-t-butyl-5-methyl-2-hydroxyphenyl)-5-chlorobenzotriazole.

Further, the gel permeation chromatography was carried out using 4 columns of TSK gel G2000H HR, G3000H HR, G4000H HR, and GMH-H HR (trade names, all manufactured by TOSOH CORPORATION) connected in series, using tetrahydrofuran as the eluent, and under the conditions of a flow rate of 1 ml/minute, a temperature of 40° C., a sample concentration of a 0.1% by weight of a tetrahydrofuran solution, and a sample injecting amount of 500 $\mu$l. A differential refractometer was used as the detector (hereinafter the same). Also, MFR was measured by the method A according to JIS K 7210 under the conditions of a temperature of 230° C. and a load of 21.18N (hereinafter the same).

EXAMPLE 2

A pressure-sensitive adhesive solution composed of 100 parts of a polyisobutylene having the weight average molecular weight of 800,000, 35 parts of polyisobutylene having the weight average molecular weight of 90,000, and 800 parts of toluene was coated on a 35 μm thick polypropylene film containing titanium oxide and dried at 80° C. for 3 minutes to obtain a protective sheet having a 18 μm thick pressure-sensitive adhesive layer.

The polypropylene film was formed by an extrusion molding method by a T die of a compounded mixture of 54 parts of homopolypropylene having MFR of 10 g/10 min, 37.7 parts of random polypropylene having MFR of 5 g/10 min, 8 parts of titanium oxide, and 0.3 part of 2-(3-t-butyl-5-methyl-2-hydroxyphenyl)-5-chlorobenzotriazole.

EXAMPLE 3

A pressure-sensitive adhesive solution composed of 100 parts of polyisobutylene having the weight average molecular weight of 400,000 and 700 parts of toluene was coated on a 25 μm thick polypropylene film containing titanium oxide and dried at 80° C. for 3 minutes to obtain a protective sheet having a 12 μm thick pressure-sensitive adhesive layer. The polypropylene film was formed by the same manner as in Example 1 except that the thickness was changed.

COMPARATIVE EXAMPLE 1

A protective sheet was obtained in the same manner as in Example 1 except that the thickness of the polypropylene film was changed to 50 μm.

COMPARATIVE EXAMPLE 2

A protective sheet was obtained in the same manner as Example 2 except that the thickness of the polypropylene film was changed to 40 μm.

Evaluation Test

Reference Example

An electrodeposition primer and an intermediate paint were painted on a 0.8 mm thick steel plate, and an acryl-urethane two pack type paint for a body external plate (RETAN PG 80, tradename, manufactured by Kansai Paint Co., Ltd.) or for a bumper (SOFLEX 200, tradename, manufactured by Kansai Paint Co., Ltd.) was coated thereon. The paint was cured and aging treated under the conditions shown in Table 1 below to form each painted plate. The painted plate was allowed to stand in a constant temperature chamber of 23° C. for 4 hours, and a Knoop hardness of the painted plate was measured using a hardness tester Model DMH-2 (manufactured by Matsuzawa Seiki K.K.) under the conditions of a load of 25 g and a load retention time of 20 seconds. A larger value of the Knoop hardness shows the hardness being harder.

The results obtained are shown in Table 1 below.

TABLE 1

| Painted Plate No. | Kind of Paint | Curing Condition | Aging Condition of Paint Film | Knoop Hardness |
|---|---|---|---|---|
| A | For Body External Plate | 30 min. at 130° C. | Within 2 hours | 15 |
| B | For Body External Plate | 30 min. at 80° C. | 72 hours | 10 |
| C | For Bumper | 30 min. at 80° C. | 10 days | 6 |
| D | For Bumper | 30 min. at 80° C. | 3 days | 3 |

The following tests were then carried out on each of the protective sheets obtained in the examples and the comparative examples. Young's modulus and coefficient of flexural stress:

Each protective sheet having a width of 25 mm was pulled by a tension test machine under the conditions of a tensile speed of 300 mm/minute and a zipper interval of 100 mm in the atmosphere of 23° C., 65% RH, and from the tangent at the initial stage of increasing stress on the S—S curve, the Young's modulus (tensile elastic modulus) was determined. The coefficient of flexural stress was calculated from the Young's modulus and the thickness of the film. Tracing property and adhesive remaining property:

Each protective sheet was adhered to the painted plate in a definite aged state obtained in Reference Example while taking in air and wrinkles under the atmosphere of 23° C., 65% RH. After heat-treating the assembly at 70° C. for 170 hours, it was allowed to stand at room temperature for 24 hours. The protective sheet was peeled and removed from the painted plate, and the presence and absence of traces and adhesive remaining were determined.

Regarding the microdeformation property, a difference in level formed at the take-in portion of air and wrinkles, etc., of the surface of the coated film on the painted plate was measured and evaluated by the following standard.

5: The case of not visually observing the gap.
4: The case that the gap is lower than 0.1 μm.
3: The case that the gap is from 0.1 μm to 0.5 μm.
2: The case that the gap is from 0.5 μm to 1.0 μm.
1: The case that the gap is over 1.0 μm.

TABLE 2

| | Young's Modulus (N/mm$^2$) | Co-efficient of flexural stress | Microdeformation Property Painted Plate | | | | Adhesive Remaining Painted Plate | | | |
|---|---|---|---|---|---|---|---|---|---|---|
| | | | A | B | C | D | A | B | C | D |
| Example 1 | 920 | 0.025 | 5 | 4 | 5 | 4 | No | No | No | No |
| Example 2 | 690 | 0.030 | 5 | 4 | 5 | 4 | No | No | No | No |
| Example 3 | 920 | 0.014 | 5 | 4 | 5 | 4 | No | No | No | No |
| Comparative Example 1 | 920 | 0.115 | 3 | 2 | 3 | 1 | No | No | No | No |
| Comparative Example 2 | 690 | 0.044 | 4 | 2 | 4 | 2 | No | No | No | No |

While the invention has been described in detail and with reference to specific embodiments thereof, it will be apparent to one skilled in the art that various changes and modifications can be made therein without departing from the spirit and scope thereof.

What is claimed is:

1. A sheet for protecting paint films of automobiles for adhering to incompletely cured paint films of automobiles comprising a two pack urethane paint, said sheet comprising a support and a pressure-sensitive adhesive layer formed thereon, wherein the sheet has a Young's modulus of at least 75 N/mm$^2$ and a coefficient of flexural stress k represented by formula k=Eh$^3$ wherein h is a thickness (mm) of the support, and k is 0.035 or less.

2. The sheet for protecting paint films of automobiles as claimed in claim 1, wherein the paint films of automobiles are selected from the group consisting of paint films for body external plates having a Knoop hardness of from 5 to 13, paint films for bumpers having a Knoop hardness of from 2 to 8, and paint films in an incompletely cured state of from 40 to 80% of the completely cured state based on the hardness.

3. The sheet for protecting paint films of automobiles as claimed in claim 1, wherein the support comprises an olefinic polymer compounded with an inorganic filler.

4. The sheet for protecting paint films of automobiles as claimed in claim 1, wherein the pressure-sensitive adhesive layer is a layer having a thickness of from 10 to 20 $\mu$m comprising a polyisobutylene having a weight average molecular weight of from 300,000 to 800,000, an isobutylene-isoprene copolymer, or a mixture thereof.

5. The sheet for protecting paint films of automobiles as claimed in claim 1, wherein the sheet has the Young's modulus of 100 to 2,000 N/mm$^2$.

6. The sheet for protecting paint films of automobiles as claimed in claim 1, wherein the sheet has the coefficient of flexural stress of 0.005 to 0.033.

* * * * *